United States Patent Office 3,766,253
Patented Oct. 16, 1973

3,766,253
MONO-ENOL ESTERS OF 2-ALKYL-
CYCLOALKANE-1,3-DIONES
Amnon Mordechai Cohen, Amersfoort, Netherlands, assignor to Polak's Frugal Works, N.V., Amersfoort, Netherlands
No Drawing. Filed Dec. 10, 1970, Ser. No. 97,013
Claims priority, application Netherlands, Dec. 16, 1969, 6918843
Int. Cl. C07c 69/14, 69/24
U.S. Cl. 260—488 R                    2 Claims

ABSTRACT OF THE DISCLOSURE

New compounds having the generic formula

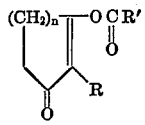

wherein R represents a straight-chained or branched alkyl radical containing from 4 to 7 carbon atoms or a cycloalkyl radical, R' represents methyl or ethyl and $n$ represents an integer from 1 to 2. The new compounds are useful as perfume ingredients.

---

The present invention relates to new mono-enol esters of cyclic diones, more particularly to new enol acetates and enol propionates of 2-alkylcyclopentane-1,3-diones and 2-alkylcyclohexane-1,3-diones, which possess interesting olfactory properties and which therefore are useful in the preparation of a great variety of perfume compositions.

The new compounds of the invention can be represented by the following generic formula:

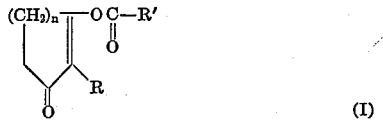

wherein $n$ represents an integer from 1 to 2, R represents an alkyl radical having from 4 to 7 carbon atoms and R' represents methyl or ethyl.

The substituent represented by R in the above Formula I can be a straight chain radical such as n-butyl, n-pentyl, n-hexyl or n-heptyl or a branched alkyl radical, i.e., a secondary or tertiary alkyl radical, in particular an isoalkyl radical, and a cycloalkyl radical.

One sub-class of compounds of this invention includes the keto-esters of Formula I wherein $n$ is 1, R is an alkyl radical having from 4 to 7 carbon atoms and R' is methyl or ethyl.

A further sub-class of compounds of this invention includes the keto-esters of Formula I wherein $n$ is 2, R is an alkyl radical having from 4 to 7 carbon atoms and R' is methyl or ethyl.

The keto-esters (represented by Formula I) of this invention can be prepared by condensing 2-alkylcyclopentane-1,3-diones and 2-alkylcyclohexane-1,3-diones with acetic anhydride or propionic anhydride, respectively, with or without catalysts. The acid anhydrides may be replaced by any other reagent which converts ketones to the corresponding enol-esters.

This synthesis can be represented by the following equation:

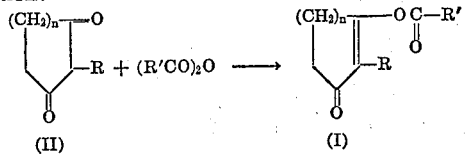

Some of the 2-alkyl-cycloalkane-1,3-diones (II) which may be used for carrying out this process are known compounds and various methods are known for their preparation, e.g., the cyclization of the corresponding γ- or δ-keto-acids in the presence of acetyl chloride or propionyl chloride and aluminum chloride (H. Schick et al., Chem. Ber. 100, 2973 (1967)).

Another method consists in condensing glutaric or succinic acid respectively with an excess of an aliphatic acid chloride in the presence of aluminum chloride (a H. Schick and G. Lehmann, J. Prakt. Chem. [4], 38, 391 (1968); b V. M. Dziomko and O. V. Ivanov, Zh. Org. Khim. 3, 712 (1967)).

Still another method consists in condensing enol acetates of aldehydes or ketones with chlorides or anhydrides of the dicarboxylic acids in the presence of aluminum chloride (a V. J. Grenda et al., J. Org. Chem. 32, 1236 (1967), b DDR Pat. No. 58,301).

The compounds may also be prepared by the cyclization of γ- or δ-keto-esters in the presence of sodium ethoxide or potassium tert.butoxide (a British Pat. No. 907,-431, b Org. Reactions Vol. 8, p. 79 (1954); c R. Bucourt and A. Perdet, Bull. Soc. Chim. France, 645 (1965)).

Yet another method consists in the reduction of cyclopentane-1,3,4-triones (a U.S. Pat. No. 3,285,963, b J. S. Burton, J. Chem. Soc., 1276 (1965), c D. R. Lagidza et al. Izv. Akad Nauk USSR Ser. Khim., 10, 1899 (1965)).

It is further possible to condense cyclohexane-1,3-dione with various alkyl-halides (a H. Stetter and W. Dierichs, Chem. Ber. 85, 61 (1952); b H. Stetter and M. Coenen, ibid., 87, 99 (1954); c H. Stetter et al., ibid., 188, 79 (1955)).

Also, cyclohexane-1,3-dione may be condensed with alkenyl halides followed by hydrogenation (K. W. Rosenmund and H. Bach, Chem. Ber. 94, 2394 (1961)).

Furthermore cyclopent-4-ene-1,3-dione may be treated with alkyl esters of an ortho-acid to produce the 2-alkoxy derivatives which are then reduced to the corresponding 2-alkyl-cyclopentane-1,3-diones (a French Pat. No. 1,468,-485, b T. Miki et al., Chem. Pharm. Bull. (Tokyo), 15 (5) 670 (1967)).

The enol esters of this invention possess characteristic odors, the intensity and odor-type of which depend on the alkyl group and being somewhat stronger in the series of the acetates than in the propionate-series.

The new compounds are valuable fragrance-modifiers, giving interesting new notes to floral, woody and fancy types of perfume-compositions. Especially the balancing and naturalizing properties of these compounds are striking. The notes which can be obtained by the addition of these compounds are generally of a floral, slightly greenish-fatty and/or peppery-woody type.

The compound in which $n=1$, R=$C_5H_{11}$ (n-pentyl) or $C_6H_{13}$ (n-hexyl), and R'=methyl exhibit a surprising resemblance to one of the most important components of natural jasmine absolute, namely, methyl jasmonate.

The compounds according to the invention can be used either individually or in combination, depending on the particular effect wanted. In many cases the addition of 1 to 10% by weight is sufficient if the new compounds are used as modifiers.

In floral bases which are used as additives for other perfume compositions the new compounds may be used in proportions of up to 30% by weight.

The invention is illustrated by the following examples, which are not intended to limit the scope of the invention in any way.

EXAMPLE 1

Preparation of 2-n-hexyl-3-acetoxy-2-cyclopenten-1-one
(a) Preparation of 2-n-hexylcyclopentane-1,3-dione.—
In a dry 6-l. three-necked flask fitted with a mechanical stirrer, a thermometer, a dropping funnel and a reflux condenser, protected by a calcium chloride drying tube, 400 g. of γ-ketoundecanoic acid (M. F. Ansell et al., J. Chem. Soc. 1802 (1967)) and 1200 ml. of nitrobenzene are introduced. 314 g. freshly distilled acetyl chloride are added with vigorous stirring in a period of 30 minutes. The flask is then cooled in an ice bath and 640 g. of aluminum chloride are added to the vigorously stirred reaction mixture. The rate of addition is adjusted to maintain a temperature of about 25° C. The reaction mixture is warmed up slowly to 80° C. and maintained at that temperature for 3 hours. The reaction mixture is then cooled to 5° and is poured slowly with stirring into 4 kg. of crushed ice. During the addition the temperature is kept below 0° C. with the help of an ice-salt cooling mixture. The reaction mixture is stirred at 0° C. for an additional 30 minutes and the solid product is collected on a Büchner funnel. The solid is repeatedly washed with cold water and dried. The product is recrystallized from chloroform-pentane. The yield of 2-hexyl-cyclopentane-1,3-dione, melting at 137–139° C., is 281 g. (77%).

(b) Preparation of 2-n-hexyl-3-acetoxy-2-cyclopenten-1-one.—In a 1-l. three-necked flask fitted with a mechanical stirrer and a reflux condenser, protected by a calcium chloride drying tube, 200 g. of 2-n-hexylcyclopentane-1,3-dione and 335 g. of acetic anhydride are introduced. The reaction mixture is refluxed with stirring for 1½ hours. The excess of acetic anhydride and the acetic acid formed in the reaction are removed through a short Vigreux column, under diminished pressure (20 mm.) and the residue is distilled quickly at 0.1 mm. Redistillation through a short Vigreux column yields 222 g. (90%) of 2-n-hexyl-3-acetoxy-2-cyclopenten-1-one, boiling point 86° C./0.03 mm.; $n_D^{20}$ 1.4780; exact mass calculated for $C_{13}H_{20}O_3$: 224.1412; found: 224.1414.

EXAMPLE 2

Preparation of 2-n-hexyl-3-propoxy-2-cyclopenten-1-one

By repeating the procedure described in Example 1(b) but starting from 50 g. of 2-n-hexylcyclopentane-1,3-dione and 142.8 g. of propionic anhydride, there is produced 58 g. (89%) of 2-n-hexyl-3-propoxy-2-cyclopenten-1-one, boiling at 96° C./0.03 mm., $n_D^{20}$ 1.4768, exact mass calculated for $C_{14}H_{22}O_3$: 238.1569; found: 238.1568.

The homologous alicyclic enol esters listed in Table I were prepared following the general method described in Examples 1 and 2.

TABLE I

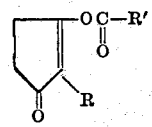

| Example | Starting compound reference | R | R' | B.P./mm. Hg | $n_D^{20}$ | Exact mass Calc. | Exact mass Found |
|---|---|---|---|---|---|---|---|
| 3 | (1) | $C_4H_9$ | $CH_3$ | 70° C./0.1 | 1.4802 | 196.1100 | 196.1095 |
| 4 | (1) | $C_4H_9$ | $C_2H_5$ | 88° C./0.2 | 1.4788 | 210.1256 | 210.1253 |
| 5 | (2) | $C_4H_9$-iso | $CH_3$ | 72° C./0.3 | 1.4792 | 196.1099 | 196.1095 |
| 6 | (2) | $C_4H_9$-iso | $C_2H_5$ | 88° C./0.3 | 1.4777 | 210.1256 | 210.1256 |
| 7 | (3) | $C_5H_{11}$ | $CH_3$ | 102° C./0.6 | 1.4790 | 210.1256 | 210.1257 |
| 8 | (3) | $C_5H_{11}$ | $C_2H_5$ | 92° C./0.02 | 1.4779 | 224.1412 | 224.1414 |
| 9 | (4) | $C_5H_{11}$-iso | $CH_3$ | 88° C./0.3 | 1.4792 | 210.1256 | 210.1256 |
| 10 | (5) | $C_7H_{15}$ | $CH_3$ | 110° C./0.2 | 1.4770 | 238.1569 | 238.1573 |
| 11 | (5) | $C_7H_{15}$ | $C_2H_5$ | 122° C./0.3 | 1.4760 | 252.1725 | 252.1724 |

[1] V. Dziomko and O. V. Ivanov, Zh. Org. Khim. 3, 712 (1967).
[2] U.S. Pat. No. 3,285,963.
[3] H. Schick et al., Chem. Ber. 100, 2973 (1967).
[4] J. S. Burton, J. Chem. Soc. 1276 (1965).
[5] Prepared from γ-ketododecanoic acid (A. A. Ponomarev and V. A. Sedavkina, Zh. Obshch. Khim. 32, 2540 (1962)), following the method described in Example 1(a).

EXAMPLE 12

Preparation of 2-n-butyl-3-acetoxy-2-cyclohexen-1-one

By repeating the procedure described in Example 1(b) but starting from 10 g. of 2-n-butylcyclohexane-1,3-dione (K. W. Rosenmund and H. Bach, Chem. Ber. 94, 2394 (1961)) and 24.6 g. of acetic anhydride, there is obtained 9 g. (72%) of 2-n-butyl-3-acetoxy-2-cyclohexen-1-one boiling at 81° C./0.1 mm., $n_D^{20}$ 1.4801; exact mass calculated for $C_{12}H_{18}O_3$: 210.12559; found: 210.12553.

TABLE II

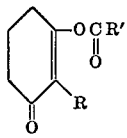

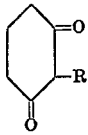

| Example | reference | R | R' | B.P./mm. Hg | $n_D^{20}$ | Exact mass Calc. | Exact mass Found |
|---|---|---|---|---|---|---|---|
| 13 | (¹) | $C_4H_9$ | $C_2H_5$ | 92° C./0.2 | 1.4782 | 224.1412 | 224.1410 |
| 14 | (¹) | $C_5H_{11}$ | $CH_3$ | 90° C./0.15 | 1.4783 | 224.1412 | 224.1408 |
| 15 | (¹) | $C_5H_{11}$ | $C_2H_5$ | 97° C./0.25 | 1.4771 | 238.1569 | 238.1567 |
| 16 | (¹) | $C_6H_{13}$ | $CH_3$ | 83° C./0.005 | 1.4772 | 238.1569 | 238.1575 |

¹ K. W. Rosenmund and H. Bach, Chem. Ber. 94, 2394 (1961).

I claim:
1. New compounds having the generic formula

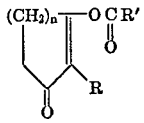

(I)

wherein R represents a straight-chained or branched alkyl radical containing from 4 to 7 carbon atoms or a cycloalkyl radical containing from 4 to 7 carbon atoms, R' represents methyl or ethyl and $n$ represents an integer from 1 to 2.

2. The compound according to claim 1 wherein R is a straight-chain alkyl radical containing 5 or 6 carbon atoms and R' is methyl.

References Cited

Chem. Abstracts, 64: 4908b.
Chem. Abstracts, 62: 456g.
Chem. Abstracts 48: 3279b.

VIVIAN GARNER, Primary Examiner

U.S. Cl. X.R.

252—522; 260—491, 493, 496